(12) United States Patent
Eugene Squire

(10) Patent No.: US 6,758,166 B2
(45) Date of Patent: Jul. 6, 2004

(54) FREEZE RESISTANT ANIMAL WATERING INSTALLATION

(76) Inventor: James Harold Eugene Squire, P.O. Box 574, Thorsby, Alberta (CA), T0C 2P0

( * ) Notice: Subject to any disclaimer, the term of this patent is extended or adjusted under 35 U.S.C. 154(b) by 0 days.

(21) Appl. No.: 10/358,426

(22) Filed: Feb. 3, 2003

(65) Prior Publication Data

US 2003/0145798 A1 Aug. 7, 2003

(30) Foreign Application Priority Data

Feb. 4, 2002 (CA) .............................................. 2370454

(51) Int. Cl.⁷ ................................................. A01K 7/06
(52) U.S. Cl. .......................................... 119/73; 119/76
(58) Field of Search ............................... 119/73, 72, 74, 119/75, 76; 239/21, 24, 28, 29

(56) References Cited

U.S. PATENT DOCUMENTS

| | | | |
|---|---|---|---|
| 1,977,346 A | 10/1934 | Moorman | 119/73 |
| 3,045,699 A | 7/1962 | Childers | 137/624.14 |
| 3,078,866 A | 2/1963 | Crow | 137/391 |
| 3,381,667 A | 5/1968 | Martin | 119/75 |
| 3,831,558 A * | 8/1974 | Forbes | 119/73 |
| 3,949,707 A | 4/1976 | Armstrong et al. | 119/73 |
| 4,397,266 A * | 8/1983 | Noland et al. | 119/73 |
| 4,440,112 A * | 4/1984 | Lilyerd | 119/73 |
| 4,585,027 A | 4/1986 | Stillions | 137/624.11 |
| 4,813,378 A | 3/1989 | Lapp | 119/73 |
| 4,922,858 A * | 5/1990 | Ahrens | 119/73 |
| 4,986,221 A * | 1/1991 | Shaw | 119/73 |
| 5,003,928 A | 4/1991 | Ketterlin et al. | 119/73 |
| 5,474,029 A | 12/1995 | Hofer | 119/73 |
| 5,553,636 A * | 9/1996 | Hoeptner et al. | 137/59 |
| 5,740,760 A * | 4/1998 | Winebrenner | 119/73 |
| 5,908,008 A | 6/1999 | Sensabaugh | 119/80 |
| 6,106,731 A | 8/2000 | Hayes | 210/760 |
| 6,363,960 B1 * | 4/2002 | Gauss | 137/60 |
| 6,390,023 B1 * | 5/2002 | Reynolds | 119/72 |

* cited by examiner

Primary Examiner—Yvonne Abbott
(74) Attorney, Agent, or Firm—Christensen O'Connor Johnson Kindness PLLC

(57) ABSTRACT

A freeze resistant animal watering installation includes a trough and a substantially vertical flow tube which provides water under pressure to the trough upon a valve actuator being activated by an animal accessing the trough. Any excess water is drained to a storage reservoir installed underground below frost level. A venturi is positioned on the flow tube in fluid communication with the storage reservoir, such that the flow of water along the flow tube serves to draw water from the storage reservoir.

11 Claims, 2 Drawing Sheets

FREEZE RESISTANT ANIMAL WATERING INSTALLATION

FIELD OF THE INVENTION

The present invention relates to a freeze resistant animal watering installation.

BACKGROUND OF THE INVENTION

U.S. Pat. No. 3,381,667 (Martin 1968) is an example of a freeze resistant animal watering installation which provides water to an animal at a trough upon demand and drains excess water from the trough to prevent freezing when the animal finishes drinking.

SUMMARY OF THE INVENTION

The present invention relates to an alternative configuration of freeze resistant animal watering installation.

According to the present invention there is provided a freeze resistant animal watering installation which includes a trough and a substantially vertical flow tube having an upper end in fluid communication with the trough and a lower end adapted for connection to a source of water under pressure. A valve is positioned at the lower end of the flow tube which is adapted to control the flow of water from the water source. The valve has an open position, a closed position and is normally in the closed position. A valve actuator is positioned at the trough, the valve actuator being adapted to permit activation by an animal accessing the trough to move the valve to the open position whereby water from the water source flows up the flow tube to the trough. A storage reservoir is adapted for installation underground below frost level. The storage reservoir is in fluid communication with the lower end of the flow tube. It has a capacity that is greater than the combined capacity of trough and the flow tube, such that the trough and the flow tube drain into the storage reservoir. Means is provided for selectively emptying the storage reservoir upon the valve actuator being moved to the open position.

The animal watering installation, as described above, provides water to the trough upon demand by an animal. Any water dispensed, but not consumed by the animal, drains into the storage reservoir. The storage reservoir is emptied by to meet the needs of the next animal that seeks a drink at the trough. The preferred means for emptying the storage reservoir upon the valve actuator being moved to the open position is a venturi. The venturi is preferred as it does not require power to operate. The venturi is positioned on the flow tube in fluid communication with the storage reservoir, such that the flow of water along the flow tube serves to draw water from the storage reservoir.

Although beneficial results may be obtained through the use of the freeze resistant animal watering installation, as described above, with some trough configurations it may be advisable to provide measures to ensure that the trough does not overflow. For if the trough does overflow, the water which overflows will freeze making the footing for animals approaching the trough treacherous. Even more beneficial results may, therefore, be obtained when means is provided to prevent overflow of the trough including a substantially vertical overflow tube having an upper end and a lower end. The upper end is positioned in the trough and the lower end communicates with the storage reservoir. The overflow tube serves to limit the level of water in the trough as water reaching the upper end of the overflow tube flows from the trough to the storage reservoir through the overflow tube.

Another means to prevent overflow of the trough which can be used as an alternative to or in combination with the overflow tube is an overflow drain which is adapted to divert water which overflows the trough.

There are various types of animal activated valve actuators which can be used with the system. Beneficial results have been obtained through the use of a spring loaded activation member which is connected by an activator rod to the valve, as will hereafter be further described.

In making the installation, the components can be installed individually or can come pre-assembled with a protective outer casing.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
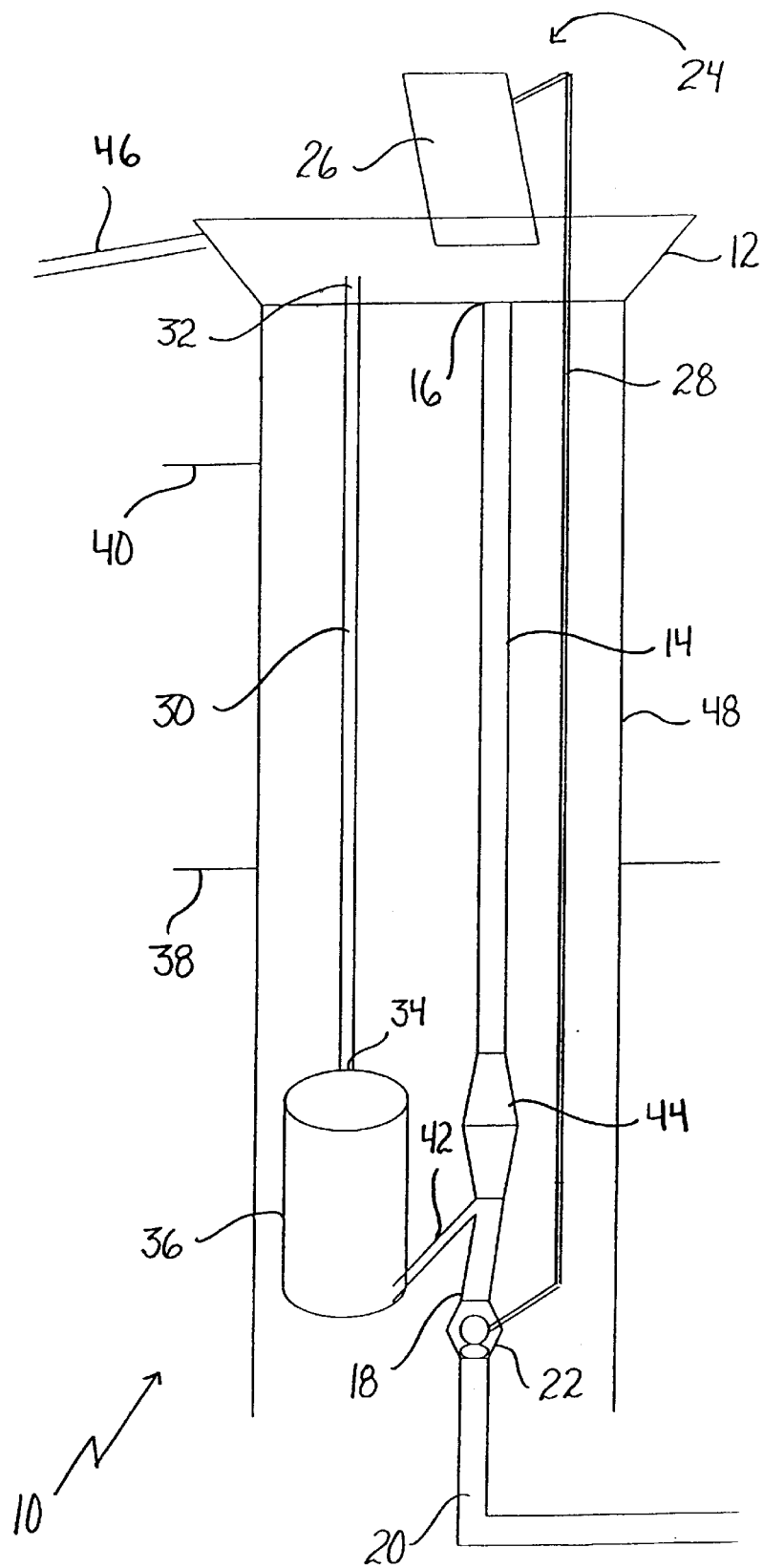
FIG. 1 is a side elevation view, in section, of a freeze resistant animal watering installation constructed in accordance with the teachings of the present invention with the valve actuator in a first position and the valve in an open position.

The preferred embodiment, a freeze resistant animal watering installation generally identified by reference numeral 10, will now be described with reference to FIGS. 1 and 2.

Figure 2:
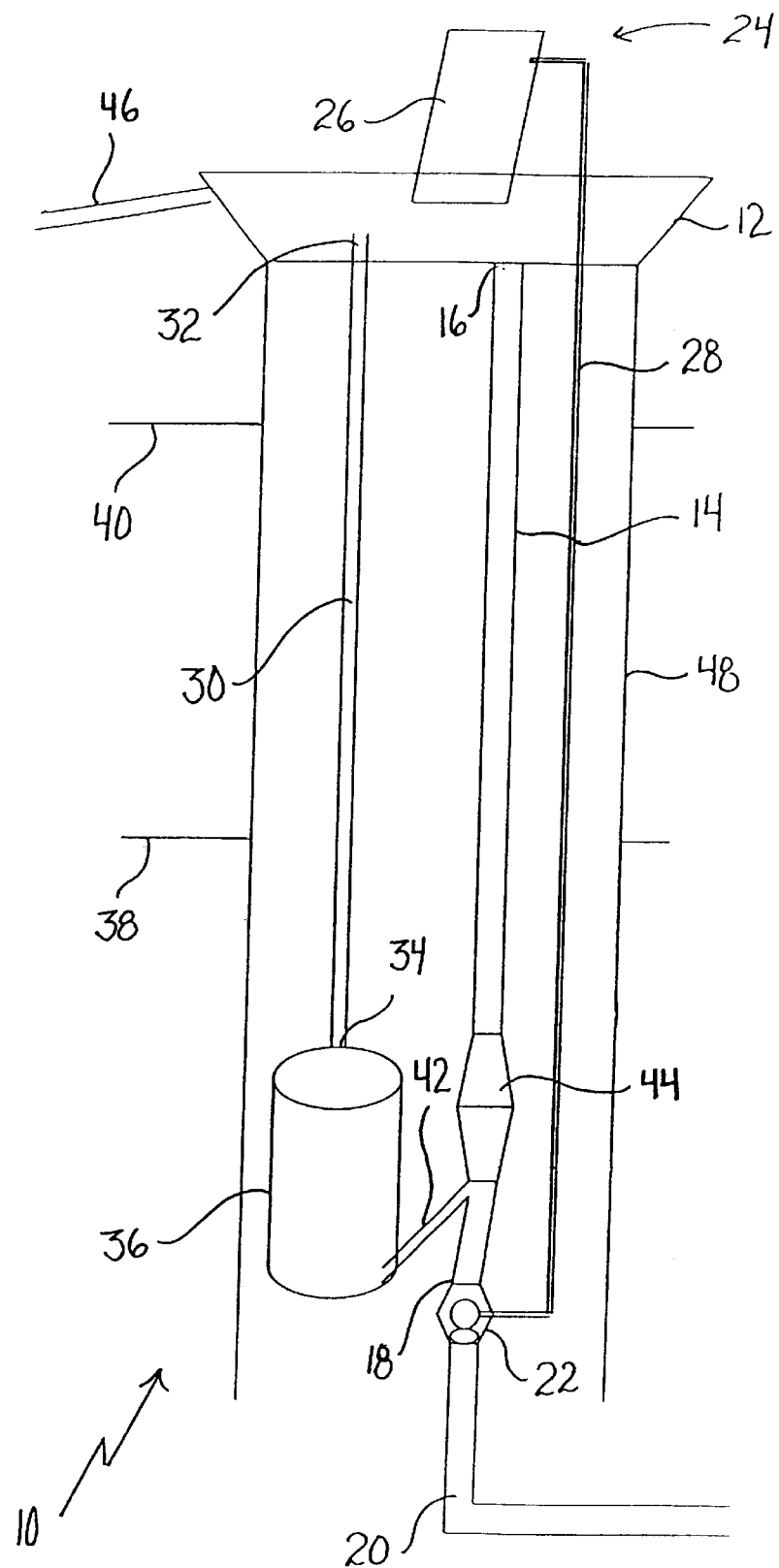
FIG. 2 is a side elevation view, in section, of the freeze resistant animal watering installation illustrated in FIG. 1, with the valve actuator in a second position and the valve in a closed position.

Structure and Relationship of Parts:

Referring to FIGS. 1 and 2, freeze resistant animal watering installation 10 includes a trough 12 and a substantially vertical flow tube 14. Flow tube 14 has an upper end 16 that is in fluid communication with trough 12 and a lower end 18 that is adapted for connection to a source of water under pressure through a pressure line 20. A valve 22 is positioned at lower end 18 of flow tube 14 which is adapted to control the flow of water from water source which flows through pressure line 20 and into flow tube 14. Valve 22 has an open position, as illustrated in FIG. 1, and a closed position as illustrated in FIG. 2. Valve is normally in the closed position as illustrated in FIG. 2.

Referring to FIGS. 1 and 2, a valve actuator, generally referenced by numeral 24, is positioned at trough 12. Valve actuator 24 includes a spring loaded activation member 26 which is connected by an activator rod 28 to valve 22 to permit activation by an animal accessing trough 12 by pressing against activation member 26 to move valve 22 to the open position whereby water from water source flows from pressure line 20 and up flow tube 14 to trough 12. A substantially vertical overflow tube 30 is provided that has an upper end 32 and a lower end 34. Upper end 32 is positioned in trough 12. Overflow tube 30 serves to limit the level of water in trough 12 as water reaching upper end 32 of overflow tube 30 flows from trough 12 through overflow tube 30.

Referring to FIGS. 1 and 2, a storage reservoir 36 is provided that is adapted for installation underground below frost level 38 beneath a ground surface 40. Storage reservoir 36 is linked by a drainage channel 42 to lower end 18 of flow tube 14 and is in fluid communication with lower end 34 of overflow tube 30. Storage reservoir 36 has a capacity that is greater than the combined capacity of trough 12, flow tube 14 and overflow tube 30, such that trough 12, flow tube 14 and overflow tube 30 drain into storage reservoir 36.

A venturi 44 is positioned on flow tube 12 in fluid communication with drainage channel 42 to storage reservoir 36, such that the flow of water along flow tube 14 serves to draw water from storage reservoir 36. Trough 12 has an overflow drain 46 which is adapted to divert water so as to prevent water from overflowing trough 12 should problems be encountered with overflow tube 30. These problems can take a number of forms. Overflow tube 30 could become blocked. Spring loaded activation member 26 could become broken or jammed in some manner. An animal could rest against spring loaded activation member 26 for an inordinate length of time, without drinking.

In the illustrated embodiment, freeze resistant animal watering installation 10, as described above, has a protective outer casing 48, although it will be appreciated that freeze resistant animal watering installation 10 could operate without protective outer casing 48.

Operation:

The operation of freeze resistant animal watering installation 10 will now be described with reference to FIGS. 1 and 2. Animal watering installation 10, as described above, provides water to trough 12 upon demand by an animal. Referring to FIG. 1, when animal at trough 12 presses against activation member 26 to move valve 22 to the open position, water from water source flows along pressure line 20 and up flow tube 14 to trough 12. As the water in trough 12 reaches the level of upper end 32 of overflow tube 30, any excess water flows down overflow tube 30 and into storage reservoir 36. If the animal continues to press upon activation member 26 maintaining valve 22 in the open position, water is drawn by venturi 44 from storage reservoir 36 as water continues to flow up flow tube 14. Referring to FIG. 2, after animal ceases to press against activation member 26, valve 22 returns to the closed position preventing any further water from flowing up flow tube 14 and into trough 12. Any water remaining in flow tube 14 drains by force of gravity to storage reservoir 36 via drainage channel 42. Any water dispensed, but not consumed by the animal, drains from trough 12 into flow tube 14 and into storage reservoir 36 via drainage channel 42.

Referring to FIG. 1, when the next animal presses upon activation member 26 to move valve 22 to the open position, water passing up flow tube 14 causes venturi 44 to draw water from storage reservoir 36. Another means to prevent overflow of trough 12 which can be used as an alternative to or as a secondary overflow protection in the event that overflow tube 30 becomes plugged, is overflow drain 46 which is adapted to divert water which overflows trough 12.

It should be noted that there are some modifications that can be made to the illustrated embodiment without departing from the spirit and scope of the invention. The means illustrated for selectively emptying the storage reservoir upon the valve actuator being moved to the open position is venturi 44. The venturi is preferred due to the fact that it does not have any power requirements and it is, therefore, best suited for remote installations. It will be appreciated that if power was not a matter for concern, a pump or other such apparatus could be used as an equivalent of the venturi. The means illustrated for activating valve is spring loaded activation member 26. Spring loaded activation member 26 is preferred due to the fact that it does not have any power requirements and it is, therefore, best suited for remote installations. It will be appreciated that if power was not a matter for concern, proximity sensors or other forms of electronic or mechanical actuators could be used as an equivalent of spring loaded activation member 26. When electronic valve actuators such as proximity sensors are used, they do not have to be physically positioned at the trough.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A freeze resistant animal watering installation, comprising:

a trough;

a substantially vertical flow tube having an upper end in fluid communication with the trough and a lower end adapted for connection to a source of water under pressure;

a valve positioned at the lower end of the flow tube which is adapted to control the flow of water from the water source, the valve having an open position and a closed position and being normally in the closed position;

a valve actuator adapted to permit activation by an animal accessing the trough to move the valve to the open position whereby water from the water source flows up the flow tube to the trough;

a storage reservoir adapted for installation underground below frost level, the storage reservoir being in fluid communication with the lower end of the flow tube and having a capacity that is greater than the combined capacity of trough and the flow tube, such that the trough and the flow tube drain into the storage reservoir; and means for selectively emptying the storage reservoir upon the valve actuator being moved to the open position.

2. The freeze resistant animal watering installation as defined in claim 1, wherein the means for selectively emptying the storage reservoir upon the valve actuator being moved to the open position is a venturi positioned on the flow tube in fluid communication with the storage reservoir, such that the flow of water along the flow tube serves to draw water from the storage reservoir.

3. The freeze resistant animal watering installation as defined in claim 1, wherein means is provided to prevent overflow of the trough.

4. The freeze resistant animal watering installation as defined in claim 1, wherein the means to prevent overflow of the trough includes a substantially vertical overflow tube having an upper end and a lower end, the upper end being positioned in the trough and the lower end communicating with the storage reservoir, such that the overflow tube serves to limit the level of water in the trough as water reaching the upper end of the overflow tube flows from the trough to the storage reservoir through the overflow tube.

5. The freeze resistant animal watering installation as defined in claim 1, wherein the means to prevent overflow of the trough includes an overflow drain which is adapted to divert water which overflows the trough.

6. The freeze resistant animal watering installation as defined in claim 1, the valve actuator being a spring loaded activation member which is connected by an activator rod to the valve.

7. The freeze resistant animal watering installation as defined in claim 1, having a protective outer casing.

8. The freeze resistant animal watering installation as defined in claim 1, wherein the flow tube is linked with the storage reservoir by a drainage channel.

9. The freeze resistant animal watering installation as defined in claim 1, wherein the trough has an overflow drain which is adapted to divert water to prevent water from overflowing the trough should the overflow tube become blocked.

10. The freeze resistant animal watering installation as defined in claim 1, having a protective outer casing.

11. A freeze resistant animal watering installation, comprising:

- a trough;
- a substantially vertical flow tube having an upper end in fluid communication with the trough and a lower end adapted for connection to a source of water under pressure;
- a valve positioned at the lower end of the flow tube which is adapted to control the flow of water from the water source, the valve having an open position and a closed position and being normally in the closed position;
- a valve actuator positioned at the trough, the valve actuator being the valve actuator being a spring loaded activation member which is connected by an activator rod to the valve to permit activation by an animal accessing the trough by pressing against the activation member to move the valve to the open position whereby water from the water source flows up the flow tube to the trough;
- a substantially vertical overflow tube having an upper end and a lower end, the upper end being positioned in the trough, such that the overflow tube serves to limit the level of water in the trough as water reaching the upper end of the overflow tube flows from the trough through the overflow tube;
- a storage reservoir adapted for installation underground below frost level, the storage reservoir linked by a drainage channel to the lower end of the flow tube and in fluid communication with the lower end of the overflow tube, and having a capacity that is greater than the combined capacity of trough, the flow tube and the overflow tube, such that the trough, the flow tube and the overflow tube drain into the storage reservoir; and
- a venturi being positioned on the flow tube in fluid communication with drainage channel to the storage reservoir, such that the flow of water along the flow tube serves to draw water from the storage reservoir.

* * * * *